(12) United States Patent
Sato (10) Patent No.: US 10,437,919 B2
(45) Date of Patent: Oct. 8, 2019

(54) INFORMATION PROCESSING SYSTEM, INFORMATION PROCESSING METHOD, DOCUMENT PROCESSING SYSTEM, AND STORAGE MEDIUM, FOR DELETING A CONVERSION PROCESS WHEN A REQUEST TO GENERATE DOCUMENT DATA IN A FIRST FORMAT HAS BEEN CANCELED

(71) Applicant: CANON KABUSHIKI KAISHA, Tokyo (JP)

(72) Inventor: Yuichiro Sato, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 86 days.

(21) Appl. No.: 15/711,985

(22) Filed: Sep. 21, 2017

(65) Prior Publication Data
US 2018/0089153 A1  Mar. 29, 2018

(30) Foreign Application Priority Data

Sep. 29, 2016  (JP) ................. 2016-192142

(51) Int. Cl.
*G06F 17/22* (2006.01)
*G06F 17/24* (2006.01)
*G06F 17/21* (2006.01)
*G06F 16/958* (2019.01)

(52) U.S. Cl.
CPC ........ *G06F 17/2264* (2013.01); *G06F 16/986* (2019.01); *G06F 17/212* (2013.01); *G06F 17/2247* (2013.01); *G06F 17/243* (2013.01)

(58) Field of Classification Search
CPC ... G06F 17/2264; G06F 17/212; G06F 16/986
See application file for complete search history.

(56) References Cited

U.S. PATENT DOCUMENTS

2012/0242689 A1* 9/2012 Miyata ................. G06F 3/14
 345/629
2012/0254204 A1* 10/2012 Pryor-Miller ....... G06F 17/2264
 707/756
2014/0355059 A1* 12/2014 Asai ..................... G06F 3/1212
 358/1.15

FOREIGN PATENT DOCUMENTS

JP  2013257615 A  12/2013

* cited by examiner

*Primary Examiner* — Asher D Kells
(74) *Attorney, Agent, or Firm* — Canon U.S.A., Inc. IP Division (57) ABSTRACT

In a case where generation of processing-target document data in a first format by a generation unit is canceled, deletion of a conversion process identified by identified information is requested to a conversion service.

11 Claims, 6 Drawing Sheets

```
{
  "dataList" : [
    "https://storage.com/form/overlay-111/pdf/data-1.pdf",
    "https://storage.com/form/overlay-111/pdf/data-2.pdf"
  ],
  "end" : false
}
```

INFORMATION PROCESSING SYSTEM, INFORMATION PROCESSING METHOD, DOCUMENT PROCESSING SYSTEM, AND STORAGE MEDIUM, FOR DELETING A CONVERSION PROCESS WHEN A REQUEST TO GENERATE DOCUMENT DATA IN A FIRST FORMAT HAS BEEN CANCELED

BACKGROUND

Field

The present disclosure relates to an information processing system, an information processing method, a document processing system, and a program, that perform processes for generating business form document data using a cloud computing service for example.

Description of the Related Art

As a way to manage operation data and perform various processes, a cloud computing service has been developed. A user accesses a web page of the cloud service from a web browser of a client terminal via the Internet, and browses digitized business form document data an the web page. Further, there may be more use cases where the business form document data, which is being browsed, may be edited and printed according to an operation flow. Conventionally, the editing and printing functions have been realized by individual cloud services working together sequentially, such as a form service for generating business form document data in Portable Document Format (PDF) and a print service for printing the business form document data. In such a sequential system, when business form document data is used on a web page, the data is assumed to be formatted in a Scalable Vector Graphics (SVG) format which has a high compatibility with web systems, but is not compatible with data in PDF format which is the format conventionally and widely used in business form systems. An SVG format configuration is compatible with web systems because it is able to realize a dynamic expression which is difficult to realize with conventional business form document data, and provide a high-value web business form that enables renderings which are not deteriorated by screen enlargement or reduction.

Thus, after generating business form document data in PDF format based on client data and template data, the business form document data in PDF format may need to be converted into SVG format or like formats which can be used on web pages. To shorten the time needed for making a business form available on a web page after the form is generated, business form document data for generated pages may be continually transmitted to a conversion service to start a SVG conversion of the business document data into SVG format before completing the generation of the business form document data in the form service. In other words, the respective processes are executed asynchronously and in parallel.

Further, where such processes are provided on a cloud service, to improve the availability of the cloud service, each server of the form service may perform communication via a message queue service and each server may scale out (or in) according to the number of messages in the queue. With this configuration, the web form data can start being displayed before the generation of the business form is completed.

In such a web form data generation system, when an error occurs during a process to generate business form document data (PDF data), the SVG conversion process, in addition to the process to generate the business form document data, needs to be canceled. Japanese Patent Laid-Open No. 2013-257615 describes a system in which a task server acquires a task included in a job, which is managed by a group of flow service servers and a certain task process is performed. In this system, the group of flow service servers control the task server, which has not completed the task within a predetermined period of time, to cancel the task process and a different server executes the task process as a substitute.

SUMMARY

Various embodiments of the present disclosure provide an information processing system which includes a generation unit configured to generate document data in a first format;

a conversion request unit configured to request, to a conversion service that converts data in the first format to a second format asynchronously with the generation unit, to convert processing-target document data in the first format into the second format, and receive from the conversion service, identification information of the conversion process corresponding to the processing-target document data in the first format; and a deletion request unit configured to request the conversion service to delete a conversion process identified by the identification information when the generation of the processing-target document data in the first format by the generation unit is canceled.

Further features will become apparent from the following description of exemplary embodiments (with reference to the attached drawings).

DESCRIPTION OF THE EMBODIMENTS

In the system described in Japanese Patent Laid-Open No. 2013-257615 discussed above, a process in a specified task server may be canceled. However, when the form data generation process and the SVG conversion request process are operated asynchronously and in parallel, it is difficult to identify which server is performing the SVG conversion process related to the PDF data generation process in which an error has occurred. Accordingly, even when an error has occurred in the form data generation process, the SVG conversion process cannot be stopped and the process continues. To continue a process which is to be canceled is a waste of the server's computational resource and also reduces the performance of the entire system.

Various embodiments of the present disclosure have been made in view of the above conventional example. Some embodiments seek to promptly cancel a subsequent process when a preceding process ends due to an error in a system in which a plurality of related processes are performed asynchronously and in parallel.

According to various embodiments, in a system in which a plurality of related processes are performed asynchronously and in parallel, when a preceding process ends due to an error, a subsequent process can be immediately canceled. This prevents a server that executes the subsequent process and a related service from continuing the process and unnecessarily consuming the resources of the server and the cooperating service.

First Embodiment

In the following, an embodiment of the present disclosure will be described with reference to the drawings.
<System Configuration>

Figure 1:
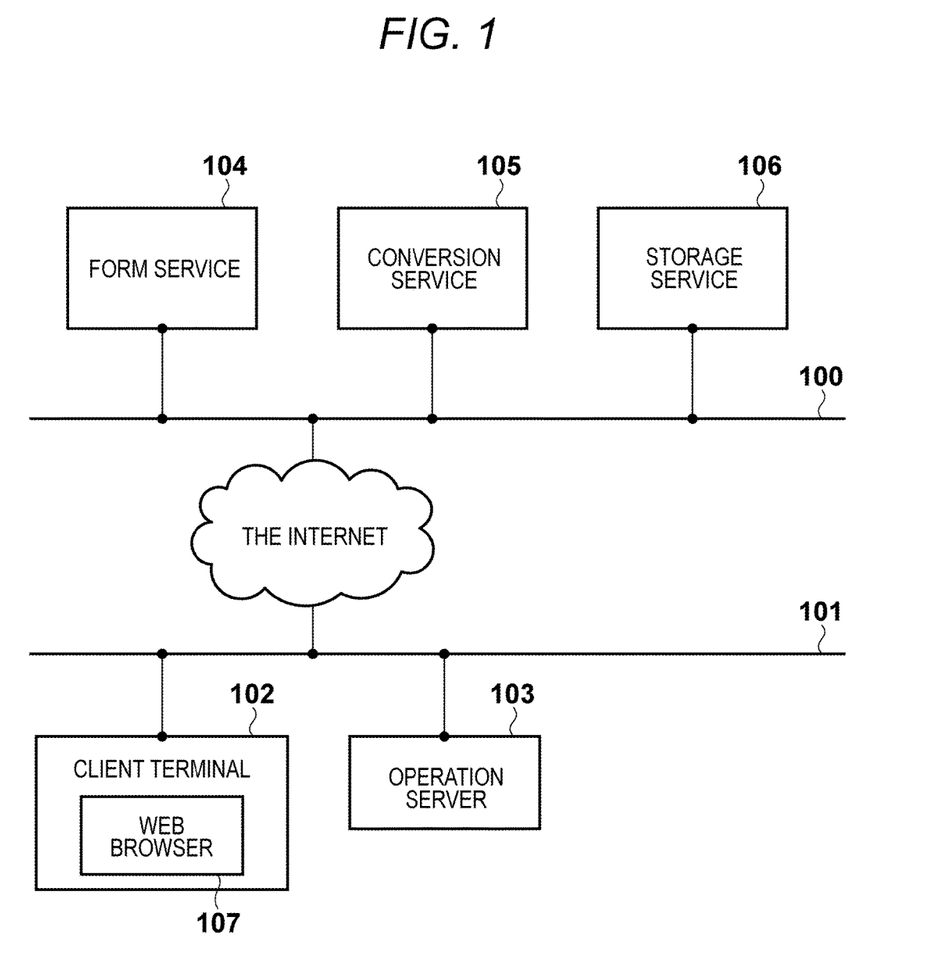
FIG. 1 is a system configuration diagram.

FIG. 1 is a block diagram illustrating a configuration of a business form system (or an information processing system) according to an embodiment of the present disclosure. A client terminal 102 is connected to a local network 101 via a wired or wireless LAN and accesses an internetwork 100 via the local network 101 to access services 104 to 106. The client terminal 102 has an environment, such as a web browser 107 and the like, for executing a program. An operation server 103 is a server that manages user operation information. The present embodiment describes a use case that the operation server 103 manages the operation information and operations are performed with the information in the operation server 103. The operation server 103 provides a screen to display operation information and instruct to generate form data in response to a request from the client terminal 102. The form service 104 is a service to receive the request from the operation server 103, generate and manage form document data in a Portable Document Format (PDF) according to the request. Then, the form service 104 sends, to the conversion service 105, a conversion request of converting the generated form document data. The conversion service 105 is a service to accept the conversion request of the form document data from the form service 104, and generate web form data in a Scalable Vector Graphics (SVG) format according to the conversion request. The storage service 106 is a service to perform file management and accept upload and download a file from the client terminal 102, form service 104, and conversion service 105.

Here, each service of the services 104 to 106 and the operation server 103 are respectively described as a single device; however, more than one server may be provided for redundancy. Further, the network that connects the above described components is, for example, one of a LAN such as the Internet, a WAN, a telephone line, a dedicated digital line, an ATM or Frame Relay line, a cable television line, a wireless data broadcasting line, and the like. Or a so-called communication network, which is realized in a combination of the above networks, may be used. It may be any network as long as the network allows to transmit or receive data.
<Hardware Configuration>

Figure 2:
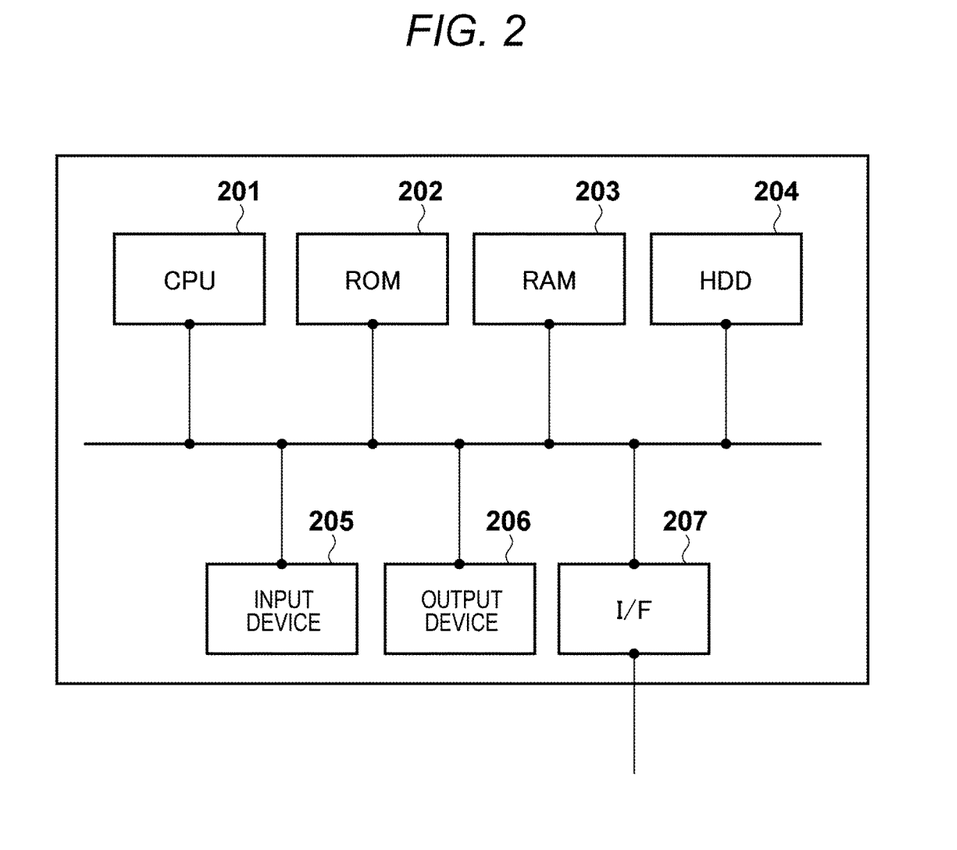
FIG. 2 is a hardware configuration diagram.

FIG. 2 is a block diagram illustrating a hardware configuration of an information processing device serving as the client terminal 102, operation server 103, form service 104, and conversion service 105 and storage service 106 of FIG. 1. In the drawing, A CPU 201 directly or indirectly controls respective devices (later described ROM, RAM, and the like), which are connected one another via an internal bus and executes a program for realizing the present disclosure. ROM 202 is a ROM that stores BIOS. RAM 203 is a RAM (direct-access storage device) that is used as a work area of the CPU 201 or is used as a temporary storage to load a software module to realize the present disclosure. A secondary storage device 204 is a hard disk drive (HDD) that stores an OS as a basic software or a software module, a solid-state drive (SSD), or the like. An input device 205 is a keyboard, a pointing device, or the like, which is not illustrated. As an output device 206, a display is connected. A network interface 207 is an interface to connect to the network 100.

In the hardware, after activated, the CPU 201 executes BIOS and the OS is executably loaded from the HDD 204 to the RAM 203. According to operation of the OS, the CPU 201 executably loads later described various software modules from the HDD 204 to the RAM 203 as needed. The various software modules are executed and operated by the CPU 201 in combination of the above respective devices. Further, the I/F 207 is connected to the internetwork 100 or the local network 101, and is controlled by the CPU 201 according to the operation of the OS to realize the communication by a communication unit.
<Software Configuration of Operation Server 103 and Management Information>

Figure 3:
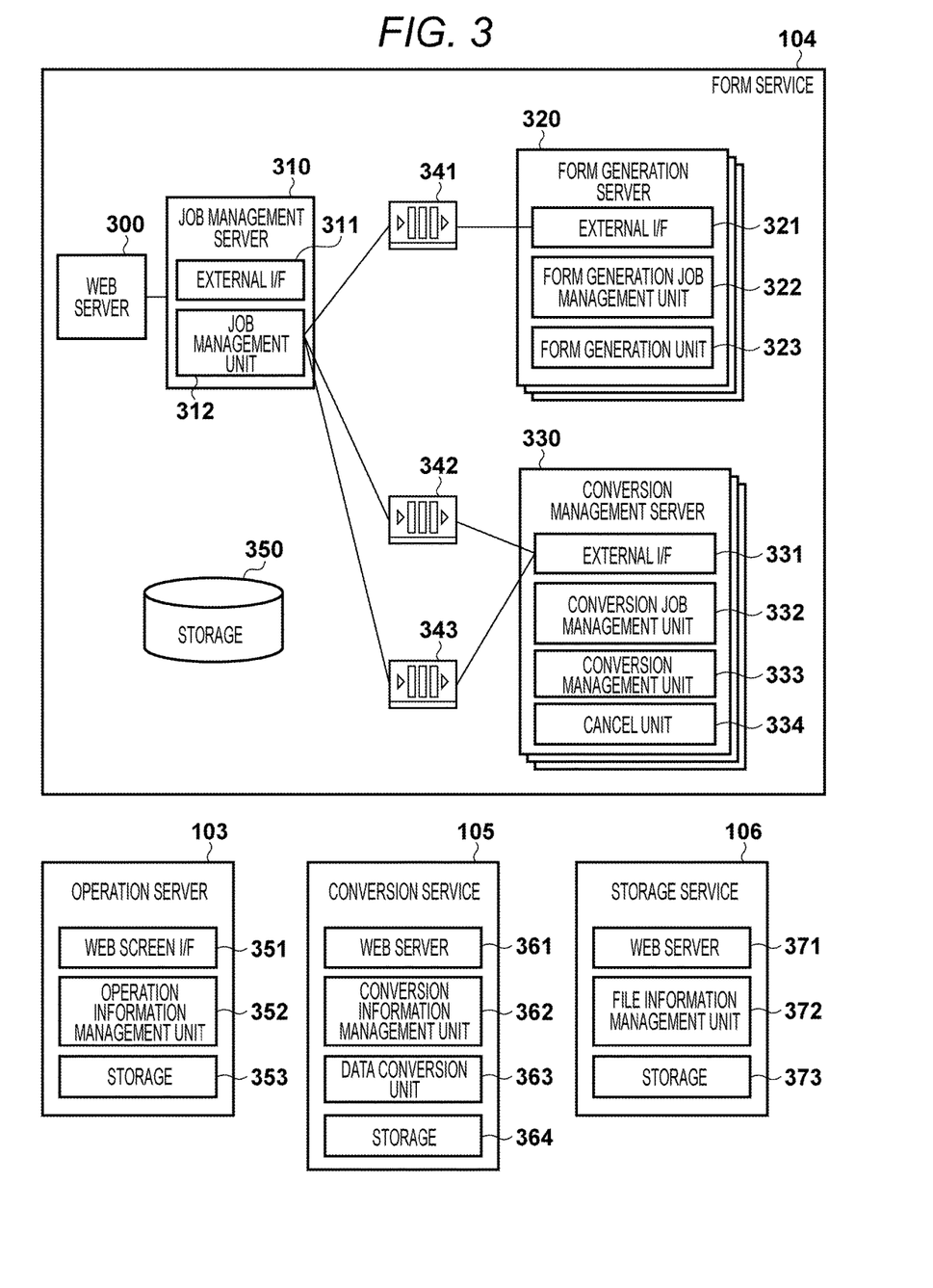
FIG. 3 is a software configuration diagram.

FIG. 3 is a software configuration illustrating the operation server and the services 104 to 106. The operation server 103 includes a web screen I/F 351, an operation information management unit 352, and a storage 353, and each software module is stored in the HDD 202 illustrated in FIG. 2 and loaded and executed in the RAM 203 by the CPU 201 as described above. The web screen I/F 351 provides a user interface of the operation server 103 and, in response to a request from the browser 107 of the client terminal 102, generates a screen to display operation information, which is managed in the operation information management unit 352 to send the screen to the client terminal 102. The operation information is stored in the storage 353 in the operation server 103 and managed in the operation information management unit 352. The information may be stored in a different server, which is made to be communicable via the internetwork 100 or local network 101, without using an external memory in the operation server 103.

Table 1 illustrates an example of client information in the operation information, which is stored and managed in advance in the operation information management unit 352.

TABLE 1

| Client Information | | | | |
|---|---|---|---|---|
| Client ID | Name | Address | Date of Birth | Contact number |
| 1 | Taro Chohyo | 1-2-3, B city, A prefecture | Jan. 1, 1989 | 090-9999-9999 |
| 2 | Hanako Chohyo | 2-3-4, D city, C prefecture | Feb 2, 1990 | 080-1111-1111 |

The client information is a data table used to generate a form. According to the present embodiment, there is information including a client ID, a client name, an address, date of birth, a contact number to uniquely identify a client. The data needed to generate the form is not limited to the client information according to the present embodiment and various items such as a stock of a product, product delivery information, cash flow information, and the like may be considered.

Table 2 illustrates an example of form information in the operation information, which is stored advance in the operation information management unit 352.

TABLE 2

Form Information

| Form ID | Name of form | Form template |
|---|---|---|
| form-001 | Plan specification A | template-001 |
| form-002 | Plan specification B | template-002 |
| form-003 | Estimate | template-003 |

The form information is a data table of form templates used to generate a form. There included are a form ID to uniquely identify form information, a name of the form to be displayed on the screen, and a template ID that identifies the form template managed in the form service 104.

The operation server 103 receives a form preview instruction from the browser 107 of the client terminal 102 via the web screen I/F 351. When the operation information management unit 352 transmits, to the form service 104, a web form generation request together with the corresponding client information and a form template ID of the form information in response to the instruction, a request for generating a web form can be performed.

<Software Configuration of Form Service 104 and Management Information>

The form service 104 includes a web server 300, a job management server 310, a form generation server 320, a conversion management server 330, a storage 350, a form generation queue 341, a conversion queue 342, and a cancel queue 343. Each software module is stored in the HDD 205 illustrated in FIG. 2 and loaded and executed in the RAM 203 by the CPU 201.

The job management server 310 includes an external I/F 311 and a job management unit 312. The form generation server 320 includes an external I/F 321, a form generation job management unit 322, and a form generation unit 323. The conversion management server 330 includes an external I/F 331, a SVG conversion job management unit 332, a conversion management unit 333, and a cancel unit 334. The web server 300 provides various interfaces of the form service 104, accepts a request from the operation server 103, and sends a response. The job management server 310 accepts a request from the web server 300, and transmits a message of a form generation request to the form generation queue 341 and transmits a message of a conversion request to the conversion queue 342. Further, the job management server 310 accepts a response message from the form generation server 320 or conversion management server 330 via the form generation queue 341, conversion queue 342, or cancel queue 343. In this case, when receiving a response message indicating an error end from the form generation queue 341, the job management server 310 transmits a conversion cancel request message to the cancel queue 343.

The form generation server 320 acquires a form generation request message via the form generation queue 341, generates form data (also referred to as form document data or document data), and transmits the generated form data, which is a PDF file, and later described overlay index file to the storage service 106. The form generation server 320 transmits a form document data generation result to the form generation queue 341 as a response message.

The conversion management server 330 acquires a conversion request message via the conversion queue 342, transmits a data conversion request to the conversion service 105, and transmits the conversion result to the conversion queue 342 as a response message. Further, the conversion management server 330 acquires a conversion cancel request message via the cancel queue 343 and transmits a conversion cancel request to the conversion service 105. The conversion management server 330 transmits a conversion cancel result to the cancel queue 343 as a response message. When the requests and response messages are transmitted and received via the queues, the form generation server 320 that performs the form data generation process and the conversion management server 330 that performs a data format conversion process can be scaled out according to the load amount. In other words, the form generation server 320 and conversion management server 330 do not have to be a single device and a plurality of devices may be provided according to the load amount. In the storage 350 of the form service 104, form template information, job information, form generation job information, and conversion job information are stored.

Table 3 illustrates an example of form template information, which is managed by the job management unit 312 and stored in the storage 350.

TABLE 3

Form Template Information

| Form template ID | Form template URL |
|---|---|
| template-001 | https://storage.com/templates/template- |
| template-002 | https://storage.com/templates/template- |
| template-003 | https://storage.com/templates/template- |

The form template information is a data table related to form template, which is managed by the form service 104. According to the present embodiment, the form template data is stored, as a file, in a later described storage service 106, and the form template information includes a URL used to acquire the data. The form template ID is an ID to uniquely identify the form template managed by the form service 104 and corresponds to the above described form template ID of the form information, which is managed by the operation server 103.

When a form generation request is accepted from the operation server 103, the job management unit 312 of the job management server 310 instructs the form generation server 320 to generate a form on the basis of the client information and form template ID included in the form generation request (or according to the form generation request). According to the present embodiment, form information is defined in the form template data in advance and the client information managed in the operation server 103 is used as the field data. The form generation unit 323 of the form generation server 320 accesses the form template URL of the form template information and acquires the form template data from the storage service 106. Then, the form information is extracted from the form template data, performs an overlay process with the client information as field data on the form information, and outputs the processed data as a PDF file.

Table 4 illustrates an example of job information, which is managed by the job management unit 312 and stored in the storage 350.

TABLE 4

Job Information

| Job ID | Form generation job ID | Conversion job ID |
|---|---|---|
| job-0001 | overlay-001 | conv-001 |
| job-0002 | overlay-002 | conv-002 |
| job-0003 | overlay-003 | conv-003 |

The job information is a data table that manages a condition of the web form data generation managed by the form service 104. The job information includes a job ID that uniquely identifies a job, a form generation job ID that uniquely identifies a form generation job managed by a later described form generation job information, and a conversion job ID that is identification information that uniquely identifies a conversion job managed by a later described conversion job information. The job ID, the form generation job ID, and the conversion job ID are issued by the job management unit 312 when the form service 104 accepts a web form data generation request.

Table 5 illustrates an example of form generation job information, which is managed by the job management unit 312 and form generation job management unit 322 and stored in the storage 350.

TABLE 5

Form Generation Job Information

| Form generation job ID | Form generation status | Form template ID |
|---|---|---|
| overlay-001 | processing | template-001 |
| overlay-002 | success | template-002 |
| overlay-003 | error | template-001 |

The form generation job information is a data table that manages a generation process status of form document data generated by the form generation server 320, which is managed by the form service 104. The form generation job information includes a form generation job ID that uniquely identifies the form generation job, a form generation status that expresses a form generation status of the form document data, and a form template ID used to generate form document data. The form generation job ID is a form generation job ID of the above described job information in Table 4 and issued by the job management unit 312 when the form service 104 accepts a web form data generation request.

Table 6 illustrates an example of conversion job information, which is managed by the job management unit 312 and conversion job management unit 332 and stored in the storage 350.

TABLE 6

Conversion Job Information

| Conversion job ID | Conversion status | Conversion service job ID | Overlay index file URL |
|---|---|---|---|
| conv-001 | processing | svg-001 | https://storage.com/pdf/001/index.json |
| conv-002 | success | svg-002 | https://storage.com/pdf/002/index.json |
| conv-003 | error | svg-003 | https://storage.com/pdf/003/index.json |

The conversion job information is a data table that manages a process status of a data conversion processed by the conversion service 105, which is managed by the form service 104. The conversion job information includes a conversion job ID that uniquely identifies the conversion job, a conversion status that indicates a data conversion process status, a conversion service job ID, which is issued by the conversion service 105 when a conversion request is transmitted to the conversion service 105, and an overlay index file URL, which is a URL of an index file of form document data composed of a plurality of PDF files. In this case, the conversion service job ID is a conversion service job ID in later described Table 7. The conversion job ID is a conversion job ID of the above described job information in Table 4 and issued by the job management unit 312 when the form service 104 accepts a web form data generation request.

<Software Configuration of Conversion Service 105 and Management Information>

As illustrated in FIG. 3, the conversion service 105 includes a web server 361, a conversion information management unit 362, a data conversion unit 363, and a storage 364. Each software module is stored in the HDD 202 illustrated in FIG. 2 and loaded and executed in the RAM 203 by the CPU 201 as described above. The web server 361 provides various interfaces of the conversion service 105, accepts a data conversion request and a conversion cancel request from the form service 104, and sends a reply. Further, in the storage 364 of the conversion service 105, the conversion information is stored.

Table 7 illustrates an example of conversion information, which is managed by the conversion information management unit 362 and stored in the storage 364.

TABLE 7

Conversion Information

| Conversion service job ID | Overlay index file URL | Conversion index file URL |
|---|---|---|
| convert-123 | https://storage.com/form/overlay-111/pdf/index.json | https://storage.com/form./overlay-111/svg/index.json |
| convert-234 | https://storage.com/form/overlay-234/pdf/index.json | https://storage.com/form/overlay-234/svg/index.json |
| convert-345 | https://storage.com/form/overlay-345/pdf/index.json | |

The conversion information is a data table related to a conversion process managed by the conversion information management unit 362. The conversion service job ID is an ID that is issued by the conversion information management unit 362 when the web server 361 of the conversion service 105 accepts a conversion request from the form service 104 and can uniquely identify conversion process. The conversion service job ID is an ID corresponding to the conversion service job ID in Table 6 although different values are shown in the examples in the tables. The overlay index file URL is a URL, which is received when a conversion request from the form service 104 is accepted and is used to access a later described index file including information of a file to be converted. The conversion index file URL is a URL to access a later described conversion index file, which is generated when the data conversion unit 363 starts a conversion process. The data conversion unit 363 regularly acquires and refers to an overlay index file and performs a process of acquiring and converting the written data to be converted and updating the converted index file. With this configuration, when the form data to be converted is generated in predetermined units of processing, the conversion processes can be performed in parallel or asynchronously respectively in units of processing. Further, in the conversion service 105, when the web server 361 accepts, from the form service 104, a conversion cancel request with the conversion service job ID as a key, the conversion information management unit 362 deletes the corresponding conversion information and the data conversion unit 363 cancels the conversion process, which is being processed. With this configuration, the conversion process is canceled.

<Software Configuration of Storage Service 106 and Management Information>

The storage service 106 includes a web server 371, a file information management unit 372, and a storage 373. Each software module is stored in the HDD 202 illustrated in FIG. 2 and loaded and executed in the RAM 203 by the CPU 201 as described above. The web server 371 provides various interfaces of the storage service 106. The file information management unit 372 manages file information and inputs or outputs a file in response to a request accepted by the web server 371. The storage 373 stores file information and a file received by the storage service 106.

Table 8 illustrates an example of file information managed by the file information management unit 372.

TABLE 8

| File Information | |
|---|---|
| Data URL | File path |
| https://storage.com/form/overlay- | /form/overlay-111/pdf/index.json |
| https://storage.com/form/overlay- | /form/overlay-234/pdf/index.json |
| https://storage.com/form/overlay- | /form/overlay-345/pdf/index.json |
| https://storage.com/form/overlay- | /form/overlay-111/svg/index.json |
| https://storage.com/form/overlay- | /form/overlay-234/svg/index.json |

The file information is information of a file stored in the storage service 106, which is managed by the file information management unit 372. The data URL is URL that can uniquely identify the file stored in the storage service 106. The file path is a file path in the storage and indicates a location where the file is stored. The request for the data URL is accepted by the web server 371, the file information management unit 372 updates the corresponding file information, and a file operation of the storage 373 is performed. For example, the client can download a corresponding file by sending an HTTP GET method request to the data URL. Further, when a request is made to the data URL by attaching a file to the HTTP PUT method, the file can be uploaded and stored. Further, when a HTTP DELETE method request is sent to the data URL, the corresponding file can be deleted.

<Index File>

Figure 4:
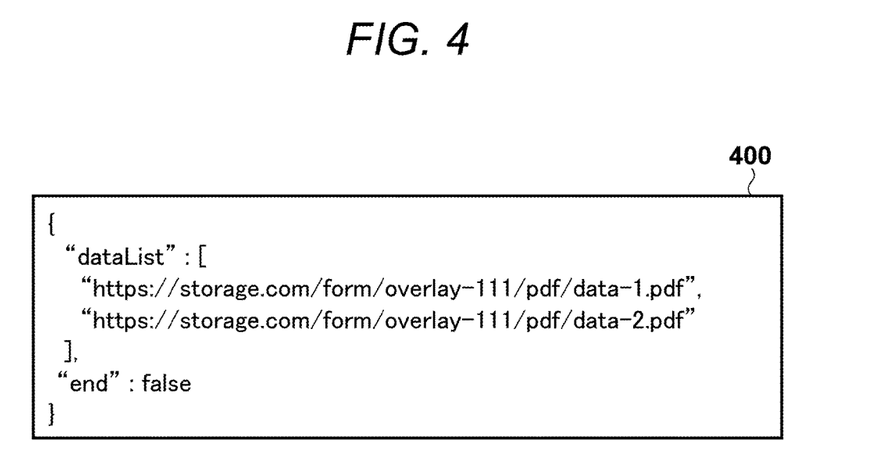
FIG. 4 is a diagram illustrating an example of an index file.

Next, an index file, which is generated respectively in a case where the form service 104 performs an overlay and a case that the conversion service 105 performs a conversion and is updated as needed, will be described.

In FIG. 4, the reference numeral 400 represents an example of an index file, which is generated and updated when the form service 104 and conversion service 105 perform an overlay output process and a data conversion process, respectively. The form service 104 and conversion service 105 firstly generate index files in the storage service 106 when a process is started. According to the present embodiment, the index file is formed in a JSON file format and is composed of a list of URLs of data processed with "dataList" as a key and a process completion flag having "end" as a key.

Here, according to the present embodiment, an overlay output result, which is the form data, is formed as a PDF file and the units of file outputting is set as one page so that three PDF files are output for a three-page form. In other words, according to the present example, one page is the unit of processing. However, the unit of file outputting is not needed to be one page, and a fixed plurality of pages, a value calculated on the basis of the number of the entire pages, or the like may be used. Further, in the conversion process by the conversion service 105, the conversion is performed in units of PDF files of the overlay output result.

The form service 104 and conversion service 105 sequentially execute processes, the processed files are uploaded to the storage service 106, and data URLs thereof are added to an index file "dataList." Further, when the process is completed and the processed file including the last page is uploaded, the form service 104 and conversion service 105 change the process completion flag "end" in the index file to true.

In other words, the index file indicates respective progresses of the form service and conversion service. The index file includes an overlay index file that indicates a progress of generating form data and a conversion index file that indicates a progress of a conversion process, in which a PDF file, which is the form data, is converted into a SVG file. Every time when one page of a PDF file is generated, the form service 104 stores the generated PDF file in the storage and records by adding a URL that indicates a storage location to the overlay index file. Then, when requested form data has been generated, the process completion flag is set to true. The conversion service 105 periodically monitors the overlay index and, when a URL that indicates a location of unprocessed form data has been added, the conversion service 105 accesses to the URL to acquire the form data in PDF and converts the data into a SVG file. The converted web form data is stored in the storage service 106 and a URL indicating the data location is added to the conversion index file. Further, in a case where the process completion flag is set as true, the unprocessed form data is converted, the generation of the web form data to be processed is stopped, and true is set to the process completion flag in the conversion index file. The generated web form data is accessed on the basis of the URL recorded in the conversion index file. For example, the client terminal 102 can access the URL written in the conversion index file to acquire the web form and display the data.

<Web Form Data Generation Cancelling Sequence>

Figure 5:
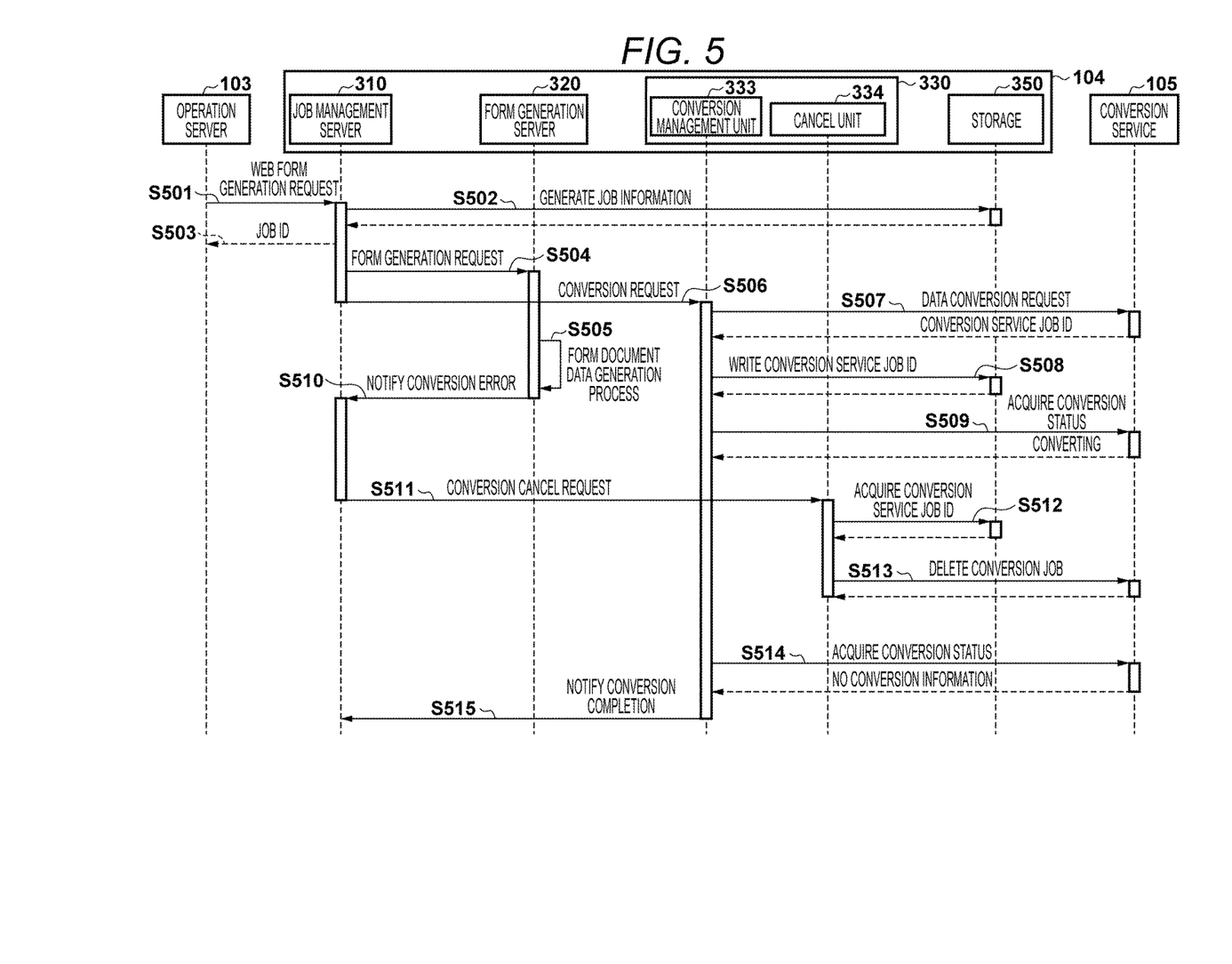
FIG. 5 is a sequence diagram of canceling a web form data generation process according to a first embodiment.

FIG. 5 is a diagram for explaining a sequence of canceling a web form data generation in a case where an error occurs in a form data generation process in the form generation server 320 during a web form data generation process. Here, it is assumed that a user transmits a web form data generation request as including a client ID of the client information and a form ID of the form information to the operation server 103 from the client terminal 102 by using an unillustrated operation screen. The present embodiment describes a sequence to cancel a data conversion process in the conversion service 105 in a case where an error occurs during a form document data generation in a later described process S505.

In S501, in response to a user's operation, the operation information management unit 352 of the operation server 103 transmits a web form generation request including a client ID included in a request, client information corresponding to a form ID, and a form template ID to the form service 104. In this case, the web server 300 of the form service 104 receives the web form generation request and transfers the request to the job management server 310.

Upon receiving the web form generation request, the job management unit 312 of the job management server 310 issues a job ID, a form generation job ID, and a conversion job ID in S502 and stores the IDs in the storage 340 as job information, form generation job information, and conversion job information.

Further, the job management server 310 adds the form template ID included in the web form generation request here to the form generation job information and stores the information in the storage 340.

In S503, the job management server 310 returns a job ID as a response. In S504, the job management unit 312 of the job management server 310 transmits a form generation request to the form generation server 320. Specifically, the job management unit 312 transmits a form document generation request message including the form generation job ID and client information to the form generation queue 341 (see FIG. 3). The external I/F 321 of the form generation server 320 acquires the form document generation request message from the form generation queue 341.

In S505, upon acquiring the form document generation request message, the form generation job management unit 322 of the form generation server 320 acquires a form template ID which is associated with the form generation job ID in the form generation job information and downloads the form template file from the storage service 106. Then, the form generation unit 323 performs overlay with the client information and a generation process of the form document data in PDF is started.

In S506, the job management unit 312 of the job management server 310 transmits, to the conversion service 105, a data conversion request to convert the form document data into web form data in a SVG format before the form document data generation in S504 and S505 is completed. Specifically, the job management unit 312 transmits, to the conversion queue 342 (see FIG. 3), a data conversion request message including the conversion job ID. The external I/F 331 of the conversion management server 330 acquires the data conversion request message from the conversion queue 342.

In S507, upon acquiring the data conversion request message, the conversion job management unit 332 of the conversion management server 330 acquires an overlay index file URL associated with the conversion job ID from the storage 350. The conversion management unit 333 transmits a data conversion request including the overlay index file URL, which is a conversion request, to the conversion service 105. Upon receiving the data conversion request in S507, the conversion service 105 issues a conversion service job ID and creates a conversion information record associated with the conversion service job ID. The data conversion unit 363 starts a conversion process and then returns the conversion service job ID to the conversion management server 330 as a response.

In S508, the conversion management unit 333 of the conversion management server 330 updates the conversion service job ID associated with the conversion job ID from the conversion job information in the storage 350 with a value of the conversion service job ID received in S507.

In S509, the conversion management unit 333 of the conversion management server 330 transmits a data conversion status acquisition request including the conversion service job ID to the conversion service 105 and acquires a data conversion process condition. When a status indicating that the data conversion process is being processed is sent from the conversion service 105 in S509, the process in S509 is repeated again after a certain period of time. With this process, the data conversion process condition is detected.

When an error occurs in the form document data generation in S505, the form generation job management unit 322 of the form generation server 320 updates the form generation status in the form generation job information as error, and the external I/F returns a form data generation error response as well as the job ID to the job management server 310 (S510). Specifically, the form generation job management unit 322 transmits a response message to the form generation queue 341 (see FIG. 3) and the job management server 310 acquires the response message from the form generation queue 341.

When the job management server 310 receives the form data generation error response in S510, the job management unit 312 of the job management server 310 transmits a conversion cancel request including the conversion job ID to the conversion management server 330 in S511. The conversion job ID corresponding to the job ID can be acquired from the job information of Table 4. Specifically, the conversion cancel request message is transmitted to the cancel queue 343 and the external I/F 331 of the conversion management server 330 acquires the request message.

When the external I/F 331 of the conversion management server 330 acquires the conversion cancel request message in S512, the conversion job management unit 332 requests a conversion service job ID associated with the conversion job ID from the storage 350.

In S513, the cancel unit 334 acquires the conversion service job ID associated with the conversion job ID in the conversion cancel request message from the storage 350. The conversion service job ID is a conversion service job ID included in a record of the conversion job information, which includes the conversion job ID of the conversion cancel request message. Then, a conversion job deletion request (which is a deletion request) including the acquired conversion service job ID is transmitted to the conversion service 105. Upon accepting the conversion job deletion request, the conversion service 105 deletes the conversion information record associated with the conversion service job ID accepted in S507, and stops the data conversion process.

In S514, the conversion management unit 333 of the conversion management server 330 transmits the conversion status acquisition request, which is the same request in S509, to the conversion service 105. In S513, the conversion service 105 cancels the data conversion process and returns a response indicating that the conversion information does not exist to the conversion management unit 333 since the conversion information associated with the conversion service job ID has been deleted.

Upon receiving the response indicating that the conversion information does not exist in S514, the conversion management unit 333 determines that the data conversion process has been canceled and transmits a data conversion completion response including the job ID to the job management server 310 in S515. Specifically, a data conversion completion response message is transmitted to the conversion queue 342 and the external I/F 331 of the job management server 310 acquires the response message.

With the above configuration, the data conversion process is canceled when an error occurs in a form document data generation process by the form generation server 320 during the web form data generation process.

As described above, the job ID, conversion job ID, and conversion service job ID are associated with one another in the job information and conversion job information. Thus, when an error occurs in a form data generation process, a conversion service job ID can be identified on the basis of the job ID of the process in which the error occurred. Then, by identifying the conversion service job ID and requesting, to the conversion service 105, to delete the conversion job from the form service 104, the process to convert the form data, which is generated in the form data generation process in which the error has occurred, into web form data can be promptly stopped and deleted. This results in saving computational resources which would otherwise be consumed and wasted by the conversion job.

Second Embodiment

According to the business form system described in the first embodiment, a deletion of a data conversion job is performed by the cancel unit 334, which is different from the conversion management unit 333 of the conversion management server 330. Thus, in a case where the conversion management unit 333 acquires a data conversion status in S514, it is difficult to determine whether the conversion job does not exist because the job has been canceled by the cancel unit 334 due to an error that occurred in a form generation process by the form generation server 320, or whether the conversion job has been deleted due to an error that occurred in a conversion process by the conversion service 105. According to the next embodiment, a business form system that can distinguish between whether a data conversion process has been canceled or a process has ended due to an error, in the business form system described in the first embodiment, will be described. The description of the contents described in the first embodiment will not be repeated.

<Web Form Data Generation Cancel Sequence>

Figure 6:
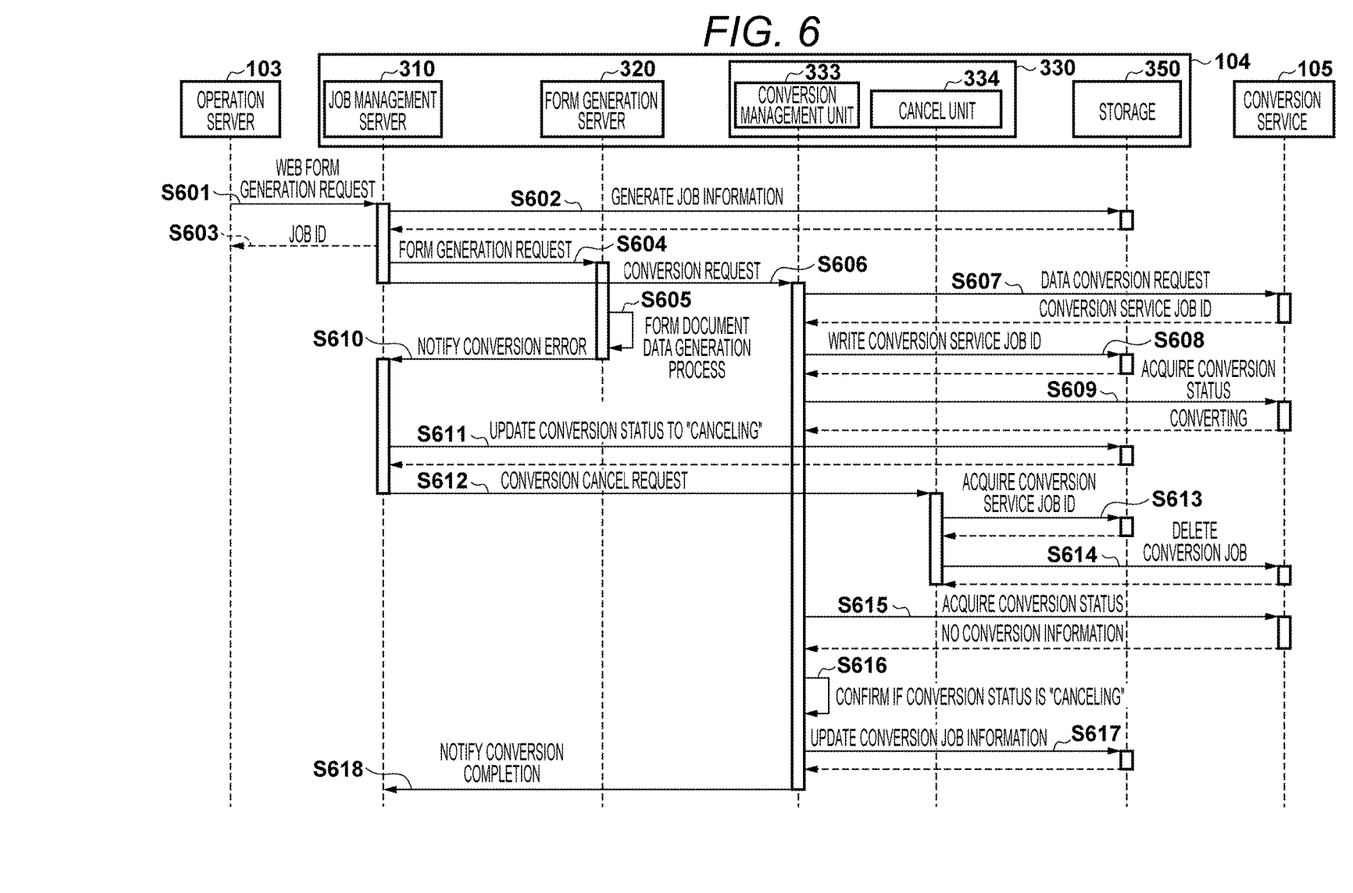
FIG. 6 is a sequence diagram of canceling a web form data generation process according to a second embodiment.

FIG. 6 is a diagram illustrating a sequence of canceling web form data generation in a case where an error occurs in a form document data generation process by the form generation server 320 during a web form data generation process. Here, it is assumed that the user transmits, by using an unillustrated operation screen, a web form data generation request including a client ID of client information and a form ID of form information from the client terminal 102 to the operation server 103. The present embodiment describes a sequence for cancelling a data conversion process by the conversion service 105 in a case where an error has occurred in a form document data generation in a later described process of S505. Since the processes from S601 to S610 are respectively similar to the processes from S501 to S510, the explanation thereof will not be repeated.

In S611, to cancel the web form generation, the job management unit 312 of the job management server 310 changes the conversion status of the conversion job ID associated with the conversion job ID of the job information to "canceling" and updates the conversion job information (Table 6) in the storage.

Since the processes from S612 to S615 are respectively similarly to the processes from S511 to S514, the explanation thereof will not be repeated.

In S616, upon receiving a response indicating that the conversion job does not exist, the conversion management unit 333 acquires the conversion job information from the storage 350 and checks whether the conversion status is "canceling."

When the status is "canceling," the conversion management unit 333 determines that the data conversion job is canceled by the cancel unit 334 and updates the conversion status of the conversion job information to "cancel completed" in S617. Then, in S618, the conversion management unit 333 transmits a data conversion cancel completion response including the job ID to the job management server 310.

When the conversion status is a status other than "canceling" or "succeeded," the conversion management unit 333 determines that the data conversion job has been deleted due to an error that occurred during a data conversion job process and updates the conversion status in the conversion job information to "end with error" in S617. Then, in S618, the conversion management unit 333 transmits a data conversion error completion response including the job ID to the job management server 310.

The above configuration enables distinguishing between whether the data conversion is ended due to an error or due to cancellation of the data conversion. The business form system according to the first and second embodiments is not limited to the above described configurations, and there may be a configuration where the form generation server and the conversion server are provided in a same server, for example. Further, the subject of the data to be created is not limited to business forms and may be other types of document data.

Other Embodiments

Embodiments of the present disclosure can also be realized by a computer of a system or apparatus that reads out and executes computer executable instructions recorded on a storage medium (e.g., non-transitory computer-readable storage medium) to perform the functions of one or more of the above-described embodiment(s) of the present disclosure, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2016-192142, filed Sep. 29, 2016, which is hereby incorporated by reference herein in its entirety.

What is claimed is:

1. An information processing system comprising:
one or more processors; and
one or more memories having stored thereon instructions that, when executed by the one or more processors, cause the information processing system to act as:
a generation unit configured to generate document data in a first format;
a conversion request unit configured to request, to a conversion service that converts data in the first format to data in a second format asynchronously with the generation unit, to convert processing-target document data in the first format into the second format, and receive from the conversion service, identification information of the conversion process corresponding to the processing-target document data in the first format; and a deletion request unit configured to request the conversion service to delete a conversion process identified by the identification information when the generation of the processing-target document data in the first format by the generation unit is canceled.

2. The information processing system according to claim 1, wherein the instructions when executed further cause the information processing system to act as:

a storage unit configured to store, in association with one another, identification information of a generation process for generating document data in the first format by the generation unit and identification information of the conversion process, wherein the deletion request unit specifies the identification information of the conversion process for converting the processing-target document data in the first format into the second format, on the basis of the identification information of the generation process and the identification information of the conversion process, which are stored in the storage unit.

3. The information processing system according to claim 1, wherein after the deletion request unit requests to delete the conversion process, the information processing system acquires from the conversion service, conversion information indicating that the document data converted to the second format by the conversion process, or, when the conversion information does not exist, determines that the conversion process is completed.

4. The information processing system according to claim 1, wherein before the deletion request unit requests to delete the conversion process, information indicating that the conversion process is being deleted is stored, and after the deletion request unit requests to delete the conversion process, information processing system acquires from the conversion service, the conversion information indicating the document data converted to the second format by the conversion process, determines that the conversion process has been deleted when the conversion information does not exist and information indicating that the conversion process is being deleted is stored, and determines that the conversion process has been deleted due to an error when the conversion information does not exit and information indicating that the conversion process is being deleted is not stored.

5. The information processing system according to claim 1, wherein the generation unit generates document data in the first format in predetermined units of processing and records a storage location of the generated document data in the first format in a first index file, and the conversion service converts the document data in the first format stored at the storage location recorded in the first index file, into the second format and records a storage location of the converted document data in the second format in a second index file.

6. The information processing system according to claim 1, wherein the generation unit generates the business form data in Portable Document Format (PDF) as the document data in the first format, and the conversion request unit converts the document data in the first format to a Scalable Vector Graphics (SVG) format as the second format.

7. The information processing system according to claim 1, wherein the generation unit generates the document data in the first format in response to a request from an operation server and requests the conversion service to convert the document data in the first format to the second format.

8. A document processing system comprising:
the information processing system according to claim 1; and
a conversion service.

9. The document processing system according to claim 8, further comprising an operation server.

10. An information processing method comprising:
generating document data in a first format;
requesting a conversion service that performs a conversion process that converts data from the first format to a second format asynchronously with the generating step, to convert processing-target document data in the first format into the second format, and receiving, from the conversion service, identification information of the conversion process corresponding to the processing-target document data in the first format; and
requesting the conversion service to delete the conversion process identified by the identification information when the generation of the processing-target document data in the first format in the generating step is canceled.

11. A non-transitory computer readable storage medium that stores instructions that, when executed, cause an information processing apparatus to perform a process comprising:

generating document data in a first format;
requesting a conversion service that performs a conversion process that converts data from the first format to a second format asynchronously with the generating step, to convert processing-target document data in the first format into the second format;
receiving, from the conversion service, identification information of the conversion process corresponding to the processing-target document data in the first format; and
requesting the conversion service to delete the conversion process identified by the identification information when the generation of the processing-target document data in the first format in the generating step is canceled.

* * * * *